United States Patent
Bae et al.

(10) Patent No.: US 12,401,471 B2
(45) Date of Patent: Aug. 26, 2025

(54) DEMODULATION REFERENCE SIGNAL BUNDLING IN CARRIER AGGREGATION

(71) Applicant: Samsung Electronics Co., Ltd., Gyeonggi-do (KR)

(72) Inventors: Jung Hyun Bae, San Diego, CA (US); Mohammed Karmoose, San Diego, CA (US)

(73) Assignee: Samsung Electronics Co., Ltd., Seoul (KR)

( * ) Notice: Subject to any disclaimer, the term of this patent is extended or adjusted under 35 U.S.C. 154(b) by 379 days.

(21) Appl. No.: 17/900,459

(22) Filed: Aug. 31, 2022

(65) Prior Publication Data

US 2023/0092533 A1    Mar. 23, 2023

Related U.S. Application Data

(60) Provisional application No. 63/280,609, filed on Nov. 17, 2021, provisional application No. 63/246,116, filed on Sep. 20, 2021.

(51) Int. Cl.
| | |
|---|---|
| *H04W 72/04* | (2023.01) |
| *H04L 5/00* | (2006.01) |
| *H04W 52/32* | (2009.01) |
| *H04W 52/34* | (2009.01) |
| *H04W 88/08* | (2009.01) |

(52) U.S. Cl.
CPC ......... *H04L 5/0048* (2013.01); *H04W 52/325* (2013.01); *H04W 52/34* (2013.01)

(58) Field of Classification Search
CPC .... H04L 5/0048; H04L 5/001; H04W 52/325; H04W 52/34; H04W 52/146; H04W 52/346

USPC .......................................................... 370/329
See application file for complete search history.

(56) References Cited

U.S. PATENT DOCUMENTS

| | | | |
|---|---|---|---|
| 9,609,647 B2 | 3/2017 | You et al. | |
| 10,841,945 B2 | 11/2020 | Lee et al. | |
| 11,310,088 B2 | 4/2022 | Ly et al. | |
| 2015/0036605 A1* | 2/2015 | Kim | H04W 24/08 |
| | | | 370/329 |
| 2018/0213489 A1* | 7/2018 | Andou | H04W 52/38 |
| 2021/0068143 A1 | 3/2021 | Lee et al. | |

(Continued)

OTHER PUBLICATIONS

Panasonic (R1-2107832, "Discussion on joint channel estimation for PUSCH", Aug. 16-27, 2021) (Year: 2021).*

(Continued)

*Primary Examiner* — Maharishi V Khirodhar
(74) *Attorney, Agent, or Firm* — The Farrell Law Firm, P.C.

(57) ABSTRACT

Disclosed is a method of transmitting a demodulation reference signal (DMRS) by a user equipment (UE) using carrier aggregation, including transmitting, over a first component carrier (CC), a first transmission using a first power and a second transmission using a third power; and transmitting, over a second CC and simultaneously with the first transmission and the second transmission over the first CC, a first transmission using a second power and a second transmission using a fourth power, wherein a sum transmission power across the first and second CCs is maintained during an entire DMRS bundling duration.

15 Claims, 4 Drawing Sheets

(56) References Cited

U.S. PATENT DOCUMENTS

2022/0104138 A1     3/2022   Park et al.
2023/0269675 A1*   8/2023   Laszkiewicz ......... H04W 52/28
                                                                                                                                                          370/318

OTHER PUBLICATIONS

ZTE corporation (R1-2106741, "Discussion on Joint channel estimation for PUSCH", Aug. 16-27, 2021). (Year: 2021).*
Lenovo (R1-2107192, Aug. 16-27, 2021, "Enhancements for joint channel estimation for multiple PUSCH") (Year: 2021).*
Huawei (R1-1706999, UL power control for short TTI, May 15-19, 2017 (Year: 2017).*

* cited by examiner

DEMODULATION REFERENCE SIGNAL BUNDLING IN CARRIER AGGREGATION

PRIORITY

This application is based on and claims priority under 35 U.S.C. § 119(e) to U.S. Provisional Application Ser. Nos. 63/246,116 and 63/280,609, which were filed in the U.S. Patent and Trademark Office on Sep. 20, 2021 and Nov. 17, 2021, respectively, the entire contents of each of which are incorporated herein by reference.

FIELD

The disclosure relates generally to wireless communication systems, and more particularly, to jointly using demodulation reference signal (DMRS) resources of multiple transmissions for channel estimation.

BACKGROUND

In the $3^{rd}$ generation partnership project (3GPP) standard for new radio (NR), a user equipment (UE) is designed to receive different downlink (DL) signals from a base station (gNB) to retrieve a variety of information from the gNB. In particular, the UE receives user data from the gNB in a configuration of time and frequency resources known as the physical DL shared channel (PDSCH). Specifically, the medium access control (MAC) layer provides user data which is intended to be delivered to the corresponding layer at the UE side. The physical (PHY) layer of the UE takes the physical signal received on the PDSCH as input to the PDSCH processing chain, the output of which is fed as input to the MAC layer.

Similarly, the UE receives control data, i.e., DL control information (DCI) from the gNB in the physical DL control channel (PDCCH). The DCI is converted into the PDCCH signal through a PDCCH processing chain on the gNB side. Conversely, a UE sends uplink (UL) signals to convey user data or control information, respectively referred to as physical UL shared channel (PUSCH) and physical UL control channel (PUCCH). The PUSCH is used by the UE MAC layer to deliver data to the gNB, and the PUCCH is used to convey control data referred to as the UL control information (UCI), which is converted to the PUCCH signal through a PUCCH processing chain at the UE side.

A UE can be scheduled a PUSCH transmission (possibly with repetition) by a dynamic grant (DG), a configured grant type 1 (CG1) or a configured grant type 2 (CG2). A PUSCH can be scheduled for transmission with repetition.

There are two repetition mechanisms for PUSCH transmission in NR third generation partnership project release 16 (hereinafter, Rel-16 NR). In Type A repetition, the UE is scheduled with a set of K repetitions, and the UE attempts to transmit K PUSCH transmissions in K consecutive slots. The transmission is dropped if one of the K slots is unavailable for UL transmission. In Type B repetition, the UE is scheduled with a set of K nominal repetitions. The UE determines a set of K actual PUSCH transmission occasions, which are not necessarily in different slots. The transmission is dropped if one of the K slots is unavailable for UL transmission. A PUSCH is typically configured with a set of DMRS resources, which the gNB uses to perform channel estimation prior to decoding the PUSCH.

In Rel-16 NR, a UE can be scheduled to transmit a PUSCH with repetition, such that the same transport block (TB) is transmitted in multiple PUSCHs which are scheduled using the same scheduling instance (e.g., the same DCI or CG).

Type A and Type B are two types of PUSCH repetitions dictating the mechanism for determining the time resources for the PUSCH transmissions. In both types, a scheduled PUSCH with repetition is associated with a start symbol S and duration L, which are used to determine the time resources for the PUSCH transmissions.

In Type A PUSCH repetition, a UE is configured with a set of K repetitions. The UE then attempts to transmit the PUSCH on K consecutive slots. If one slot of the K consecutive slots is unavailable for the PUSCH transmission, the PUSCH transmission is dropped, Determining whether a slot is available/unavailable for PUSCH transmission is subject to many aspects. For example, a slot is available for transmission if the time resources starting at symbol S within the slot and for a duration of L consecutive symbols are available for UL transmission, based on semi-static and/or dynamic time division duplexing (TDD) configurations and slot formats.

In Type B PUSCH repetition, a UE is configured with a set of K nominal repetitions that are determined by starting at slot K_s where the PUSCH is scheduled to start. Starting from symbol S, consecutive sets of L symbols are determined where each set of L symbols corresponds to a nominal PUSCH repetition. If the time resources of a nominal repetition consist of some invalid symbols, the set of resources is split into multiple sets of consecutive symbols around the set of invalid symbols, where in each set an actual transmission can be made. The determination of invalid symbols is based on semi-static TDD configurations as well as semi-static and dynamic information given to the UE related to determination of invalid symbols for type B PUSCH repetition. This information is in the form of an additional invalidation pattern which the UE can apply to determine invalid symbols.

In both types of PUSCH scheduling, the actual PUSCH transmission is governed by other factors. For example, a PUSCH transmission needs to follow the dynamically indicated slot format indicator (SFI). Thus, in case of a DG-PUSCH and CG2-PUSCH, a UE is not expected to receive an SFI which specifies a slot format that conflicts with the DG-PUSCH, and in case of a CG1-PUSCH, a UE does not transmit the PUSCH on symbols unless the UE receives an SFI explicitly indicating that such symbols are available for UL transmission.

A PUSCH transmission needs to abide by particular timelines which ensure correct UE behavior considering UE processing capability. Such timelines include a switching timeline between UL/DL. A PUSCH transmission needs to satisfy particular constraints with respect to other transmissions/receptions, such as monitoring of PDCCHs and receptions of synchronization signals blocks (SSBs).

When a UE performs DMRS bundling across the DMRS resources of a set of PUSCHs, a UE may maintain power consistency and phase continuity across those bundled DMRS resources. Conditions on maintaining power consistency and phase continuity are provided by radio access network 4 (RAN4) in Rel-16 NR.

The determination of the number of un-scheduled orthogonal frequency-division multiplexing (OFDM) symbols in-between PUSCH or PUCCH repetition is dependent on the concept of off-power requirements for a UE, which is defined in 3GPP #38.101.

Another aspect of Rel-16 NR is the ability to perform CA, in which a UE may use multiple component carriers (CCs)

for transmission, enabling the UE to utilize a larger bandwidth than what would be possible using a single CC. Rel-16 NR allows multiple modes of CA, including intra-band frequency aggregation with contiguous CCs, intra-band frequency aggregation with non-contiguous CCs, and inter-band frequency aggregation with non-contiguous CCs.

The aforementioned categorization of CA modes is dependent on the collection of bands containing the used CCs. This collection of bands may be referred to as the band combination. In NR, CA is applied across cells. The UE initially connects to one cell in the CA, which is referred to as the primary cell (PCell). Thereafter, the UE finds and connects to multiple additional cells in the CA, referred to as secondary cells (SCells). In CA, the UE can use each cell for transmission/reception of different combinations of signals. For example, a UE can send/receive a PUSCH on one cell and send/receive a sounding reference signal (SRS) on another cell. However, the standard specifies certain timeline rules and conditions for such simultaneous transmission/reception of signals in CA.

In addition, even with timeline rules and requirements, the standard does not mandate that every NR-connected UE is able to perform such simultaneous usage of CCs in CA. In fact, a UE may have the capability of performing certain transmission/reception tasks in CA while not having the capability to perform other tasks.

Another factor that affects a UE's capability is whether frequency division duplexing (FDD) or TDD is assumed. A UE may be able/unable to perform a task on FDD bands/band combinations, while it is unable/able to perform the same task on TDD bands/band combinations. To fully utilize the UE's capability and better optimize the use of the network, the gNB is informed of the UEs' capabilities, which are then considered when the gNB schedules transmission/reception of the UEs in the network.

DMRS bundling has conventionally been configured for a single cell and can be configured such that the DMRS resources of multiple PUSCH transmissions are jointly used for channel estimation. This requires certain requirements to be maintained among bundled DMRS resources. These requirements include maintenance of phase continuity among PUSCH resources with bundled DMRS resources, and maintenance of power consistency (i.e., same power level within an acceptable tolerance level) among bundled DMRS resources. This translates into conditions on the configurations associated with UL transmissions, which occur on the cell where DMRS bundling is desired. For example, if DMRS bundling is desired over a group of PUSCH repetitions in one cell, it needs to be ensured that the transmission power of these PUSCHs is identical and that the time between two consecutive PUSCHs does not exceed a set time duration.

The foregoing conditions concern a single cell but may apply to multiple cells in CA.

A UE can be configured in CA with multiple CCs, either in intra-band or inter-band scenarios, and can be configured with different PUSCH transmissions in multiple CCs. If a UE performs DMRS bundling in multiple CCs simultaneously, thereby enabling the joint use of DMRS resources among PUSCHs belonging to one CC, the UE would send multiple PUSCH transmissions simultaneously; however, the above conditions could be violated in such transmission. On the other hand, if the PUSCH transmissions are not sent simultaneously and are sent in one cell, then DMRS bundling can be performed on the one cell, which is overly restrictive. That is, enabling DMRS bundling in one cell increases the coverage of UL transmission only in that single cell. The prior art fails to provide for DMRS bundling in multiple cells and fails to provide simultaneous transmissions.

Therefore, there is a need in the art for a method and apparatus for DMRS bundling which would increase the coverage of UL transmissions in each of the multiple cells, so as to provide expanded DMRS bundling in CA.

SUMMARY

The present disclosure has been made to address at least the above-mentioned problems and/or disadvantages and to provide at least the advantages described below.

Accordingly, an aspect of the present disclosure is to provide a method and apparatus for DMRS bundling, enabling simultaneous transmissions of PUSCHs across cells in CA while maintaining DMRS bundling in multiple cells, thereby providing a more efficient use of available resources.

Another aspect of the present disclosure is to provide a method and apparatus for DMRS bundling, such that simultaneous transmissions of PUSCHs are provided while maintaining DMRS bundling in one cell, further enhancing efficiency in the use of available resources.

In accordance with an aspect of the disclosure, a method of transmitting a DMRS by a UE using carrier aggregation includes transmitting, over a first CC, a first transmission using a first power and a second transmission using a third power, and transmitting, over a second CC and simultaneously with the first transmission and the second transmission over the first CC, a first transmission using a second power and a second transmission using a fourth power, wherein a sum transmission power across the first and second CCs is maintained during an entire DMRS bundling duration.

In accordance with an aspect of the disclosure, a method of transmitting a DMRS by a UE using carrier aggregation includes transmitting, over a first component carrier (CC), a first transmission and a second transmission, and transmitting, over a second CC and simultaneously with the first transmission and the second transmission over the first CC, a first transmission, a second transmission, and a third transmission, wherein a first time frame is disposed in the second CC between a start of both the first transmission on the first CC and the first transmission on the second CC, and wherein the first time frame allows the first transmission on the second CC to start at a different time than when the first transmission on the first CC starts.

In accordance with an aspect of the disclosure, an NR UE includes at least one processor, and at least one memory operatively connected with the at least one processor, the at least one memory storing instructions, which when executed, instruct the at least one processor to perform a DMRS bundling comprising a first component carrier CC in which a first transmission and a second transmission are performed, wherein a gap exists between the first transmission and the second transmission, a second CC in which a first transmission, a second transmission, and a third transmission are performed simultaneously with the first transmission and the second transmission in the first CC, and a first time frame in the second CC, the first time frame being disposed between a start of both the first transmission in the first CC and the first transmission in the second CC, wherein the first time frame allows the first transmission on the second CC to start at a different time than when the first transmission on the first CC starts.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
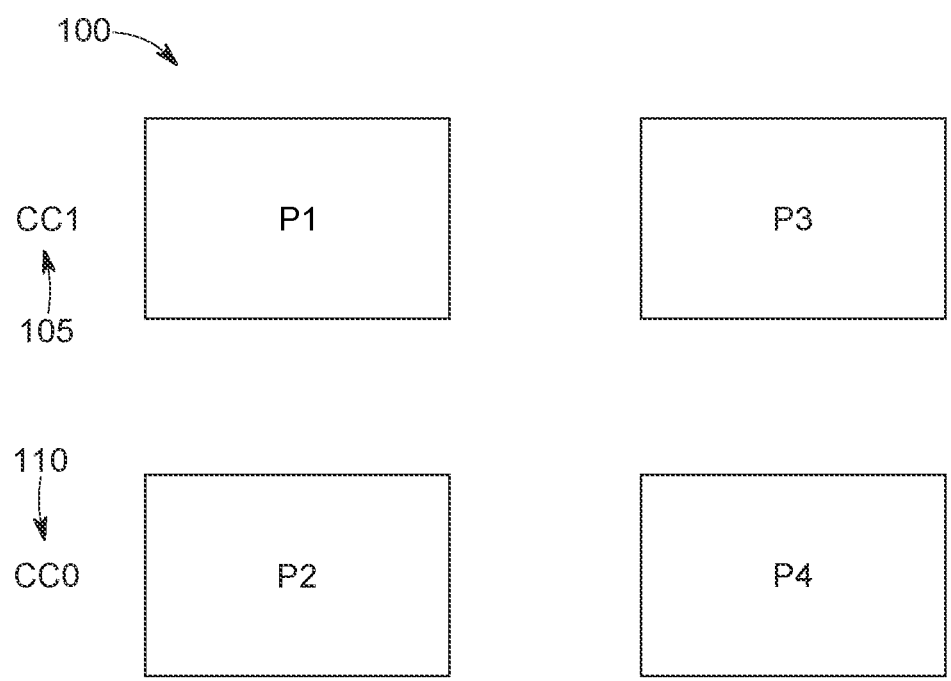
FIG. 1 illustrates a DMRS bundling configuration 100 according to an embodiment.

Embodiments of the present disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. Descriptions of well-known functions and/or configurations will be omitted for the sake of clarity and conciseness.

The expressions "have," "may have," "include," and "may include" as used herein indicate the presence of corresponding features, such as numerical values, functions, operations, or parts, and do not preclude the presence of additional features. The expressions "A or B," "at least one of A or/and B," or "one or more of A or/and B" as used herein include all possible combinations of items enumerated with them. For example, "A or B," "at least one of A and B," or "at least one of A or B" indicate (1) including at least one A, (2) including at least one B, or (3) including both at least one A and at least one B.

Terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. A first element may be referred to as a second element without departing from the scope the disclosure, and similarly, a second element may be referred to as a first element.

When a first element is "operatively or communicatively coupled with/to" or "connected to" another element, such as a second element, the first element may be directly coupled with/to the second element, and there may be an intervening element, such as a third element, between the first and second elements. To the contrary, when the first element is "directly coupled with/to" or "directly connected to" the second element, there is no intervening third element between the first and second elements.

All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The present disclosure enables a UE configured with multiple CCs in UL CA to simultaneously perform DMRS bundling in the multiple CCs.

For one CC, DMRS bundling effectively indicates that a UE should maintain phase continuity and power consistency among the DMRS resources in a certain time duration known as the bundling duration. The determination of this time duration can be dependent on the specifics of the DMRS bundling feature/mechanism. For example, the bundling duration can be the time duration which spans PUSCH/PUCCH repetitions. This is suitable if DMRS bundling is performed across the DMRS resources of PUSCH/PUCCH repetitions.

The bundling duration can be the time duration spanning a certain set of PUSCH and/or PUCCH transmissions, in case DMRS bundling is performed across certain PUSCH and/or PUCCH transmissions not necessarily belonging to one set of PUSCH/PUCCH repetitions. A DMRS bundling duration can be specified as a certain time duration, irrespective of the actual PUSCH and/or PUCCH transmissions which would be involved in the DMRS bundling operation. This duration can be based on channel characteristics, such as coherence time, and UE capability of maintaining necessary conditions for DMRS bundling but is not limited thereto.

The DMRS bundling duration can also be explicitly configured via RRC configurations or dynamic scheduling. Alternatively, the bundling duration can be implicitly derived based on existing configurations and/or information about scheduled transmissions.

In the above-described cases, the bundling duration can be described by a starting time $t_s^c$ and duration time $t_d^c$, where the subscripts s and d represent the terms start and duration respectively, and the superscript index c is the CC index where DMRS bundling is performed.

To maintain DMRS bundling, the UE is generally able to maintain phase continuity and power consistency across the bundling duration; therefore, a UE generally would not change transmission power allocation within the bundling duration.

When the UE is operating in CA, it is possible that the configured CCs, e.g., in intra-band CA cases, are jointly affected by the DMRS bundling operation. For example, a UE implementation of intra-band CA utilizes a shared power amplifier (PA) and gain control for the transmission radio frequency (RF) chain of one or more CCs. In this case, maintaining DMRS bundling in one CC can pose requirements on the transmissions in those other CCs.

The following provides examples of constraints that a DMRS bundling duration may place on the operations in intra-band CCs. Some constraints can be equivalent, while other constraints can be simultaneously enforced. If a DMRS bundling duration is established in one CC, then the following is required.

The total transmission power in all intra-band CCs may be the same in the entire DMRS bundling duration to maintain phase continuity, with inter-transmission gaps of no UL transmissions with durations no longer than the maximum allowable gap value being ignored from this condition.

Any gap of interrupted UL transmission in any of the intra-band CCs during the bundling duration may be less than the maximum allowable gap value. This would help to ensure that the UE operation satisfies the UE off power requirements while maintaining the necessary phase continuity for DMRS bundling.

If a set of UL transmissions occur simultaneously across intra-band CCs within the DMRS bundling duration, and considering the subset of UL transmissions from the set of UL transmissions which occur in each CC, the first of the transmissions in the subset may start no later than the maximum allowable gap value after the bundling duration has started, the last of the transmissions in the subset may end no earlier than the maximum allowable gap value before the bundling duration has ended, any inter-transmission gaps of no UL transmissions may be no longer than the maximum allowable gap value each, or in other words, the UL transmissions may all have the same transmission power.

It is noted that this identical transmission power condition can be relaxed such that the total power across CCs may remain constant during the DMRS bundling duration. This mitigates the need to have the same transmission power for all transmissions within the DMRS bundling duration in each CC.

FIG. 1 illustrates a MIPS bundling configuration 100 according to an embodiment. This configuration provides a relaxed power condition across CCs within a DMRS bundling duration to maintain phase and power consistency.

In FIG. 1, CC1 105 and CC0 110 are configured within a DMRS bundling duration, and two transmissions exist in each CC. Specifically, the transmissions are labelled $P_1$, $P_2$, $P_3$ and $P_4$, where $P_1$ and $P_3$ are the transmission powers in CC1 105 and $P_2$ and $P_4$ are the transmission powers in CC0 110. The relaxed condition then requires that the sum powers are identical, i.e., $P_1+P_2=P_3+P_4$ without requiring that $P_1=P_3$ or $P_2=P_4$, whereas, according to the more restrictive requirement in the prior art, the latter condition of $P_1=P_3$ or $P_2=P_4$ must hold. In addition, the gap between $P_1$ and $P_3$ as well as between $P_2$ and $P_4$ must not exceed a predetermined threshold, as will be described in relation to FIG. 2.

When 2 CCs are intra-band, the UE uses the same UL transmission circuitry (i.e., Tx chain) to perform each UL transmission, such as in $P_1$ and $P_3$ for CC1 105. The requirement of the UL transmissions to all have the same transmission power is to ensure that the Tx chain will maintain the same transmission power across each CC, such as across $P_1$ and $P_3$ in CC1 105 or across $P_2$ and $P_4$ in CC0 110.

Figure 2:
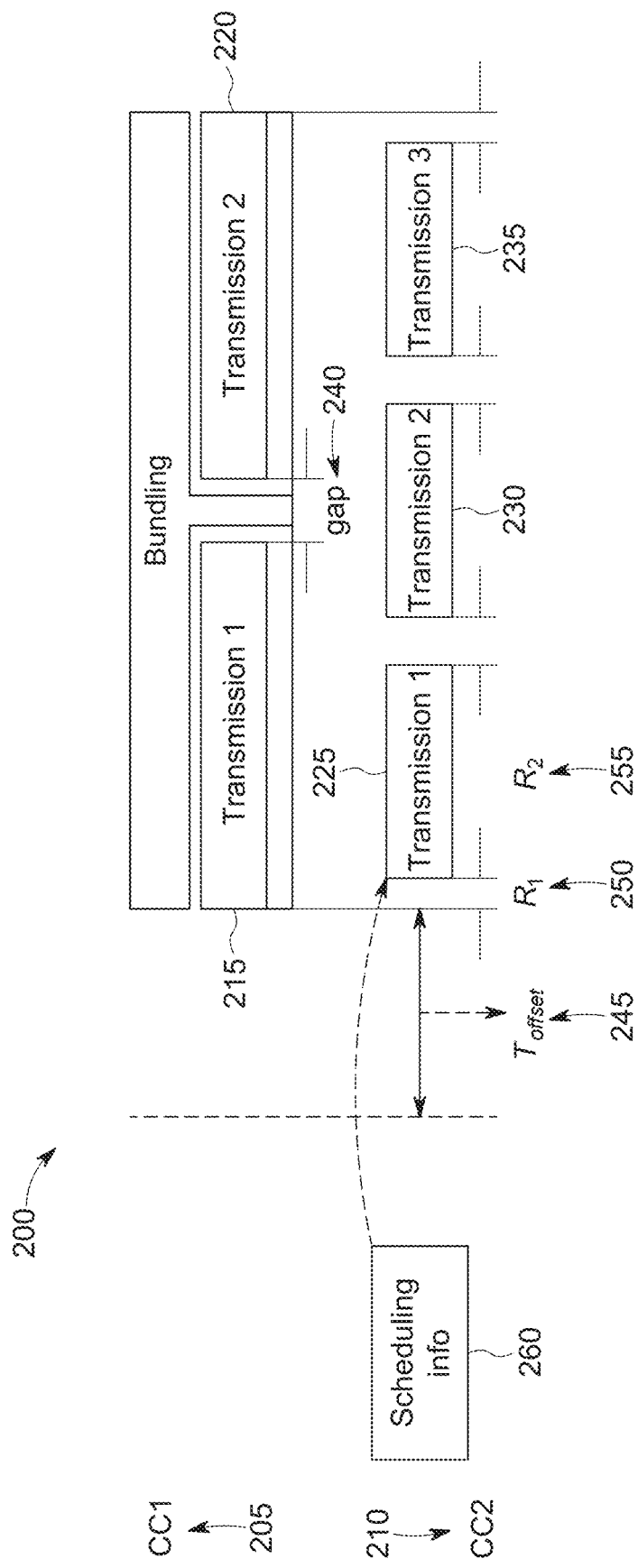
FIG. 2 illustrates DMRS bundling 200 with consecutive transmissions in different CCs, according to an embodiment.

FIG. 2 illustrates DMRS bundling 200 with consecutive transmissions in different CCs, according to an embodiment. Specifically, FIG. 2 illustrates an example of the operation illustrated in FIG.

When DMRS bundling is configured in a CC, UL transmissions in other intra-band CCs can affect the DMRS bundling operation. To maintain phase continuity and power consistency, the power transmission across CCs may be regulated. Namely, when a DMRS bundling duration is defined, all UL transmissions across CCs may be maintained such that the total transmission power across the CCs is unchanged during the bundling duration.

In FIG. 2, Transmission 1 215 and Transmission 2 220 occur on CC1 205, and Transmission 1 225, Transmission 2 230, and Transmission 3 235 occur on CC2 210, as illustrated. A gap 240 exists between Transmission 1 215 and Transmission 2 220, and the gap 240 must be within a predetermined threshold.

When a first transmission is scheduled at a time that is later than the DMRS bundling starting time, then the scheduling information 260 used for scheduling the transmission must be early enough for the UE transmission state to be maintained during the entire DMRS bundling operation. Therefore, a timeline requirement may exist for such a delayed transmission, as shown in FIG. 2, where CC1 205 is the CC with the DMRS bundling duration. This timeline can be from the beginning of the DMRS bundling duration or from the starting time of Transmission 1 215 in CC1 205.

Transmission 1 215 on CC1 205 has a power level $P_1^1$ while Transmission 2 220 on CC1 205 has a power level $P_2^1$. Due to DMRS bundling requirements, the transmission power levels of both transmissions may be the same, i.e., $P_1^1=P_2^1$. Similarly, Transmission 1 225 and Transmission 2 230 on CC2 210 have power levels $P_1^1$ and $P_1^2$ respectively. Due to the presence of Transmission 1 225 on CC2 210, the two transmissions effectively define two time regions (i.e., time frames) labelled as $R_1$ 250 and $R_2$ 255. In $R_1$ 250, only Transmission 1 215 on CC1 205 is scheduled, i.e., total transmission power across CC1 205 and CC2 210 can be $P_1^1$ in $R_1$ 250. In $R_2$ 255, both Transmission 1 215 on CC1 205 and Transmission 1 225 on CC2 210 are scheduled, so the expected total transmission power across these two CCs is $P_1^1+P_1^2$. It is noted that the time duration in region R1 250 is referred to herein as $t_s^1$. Herein, $R_1$ 250 allows Transmission 1 225 on CC2 210 to start at a different time than when Transmission 1 215 on CC1 205 starts.

As previously noted, the total transmission power across CCs is not permitted to change within the bundling duration. However, the aforementioned allocation of transmissions and power levels can lead to such an undesirable change of transmission power from $P_1^1$ in $R_1$ 250 to $P_1^1+P_1^2$ in $R_2$ 255. Therefore, power regulation may be exercised to maintain an unchanged level of total transmission power across the CCs. This requires the UE to adapt transmission powers of CC1 205 and/or CC2 210 during $R_1$ 250 to maintain consistency.

As such, the disclosure defines a look-ahead, where the UE collects scheduling information, e.g., via dynamic signaling or higher layer, related to all CCs involved in/affecting the DMRS bundling operation. The UE then uses this information to make decisions on UL transmissions and consequent transmission power levels that maintain the DMRS bundling duration. To do so, the UE needs sufficient time before receiving all necessary scheduling information 260 which can affect transmissions in the bundling duration. Therefore, before time $t_s^1-T_{offset}$ 245, all scheduling information 260 may be received by the UE to maintain consistent power level transmissions. If additional information is received after $t_s^1-T_{offset}$ 245 scheduling transmissions during the bundling duration, those transmissions are subject to the handling procedures provided in the previous section.

The value of $T_{offset}$ 245 can be set to permit the UE sufficient time to process the scheduling information 260 and determine power levels. For example, $T_{offset}$ 245 can be set to allow for decoding any PDCCH which may have scheduling information 260 of UL transmissions within the DMRS bundling duration. Therefore, $T_{offset}$ 245 can be set as the PUSCH preparation time $T_{proc,2}$, defined in TS 38.214. Alternatively, $T_{offset}$ 245 can be set to allow for the decoding of any MAC CE which can involve a change in the quasi co-located (QCL) properties of the UL transmissions during the DMRS bundling duration, such as MAC CE activating/deactivating TCI states. Therefore, $T_{offset}$ 245 can be set equal to a time duration of N slots, where e.g., N=3.

As described above, the gap 240 of interrupted UL transmission in intra-band CC1 205 during the bundling duration is over a time duration that is less than or equal to the maximum allowable gap value, thereby ensuring that the UE operation satisfies the UE off power requirements while maintaining the necessary phase continuity for DMRS bundling. The gap 240 exists when Transmission 1 225 on CC2 210 needs to be delayed after Transmission 1 215 on CC1 205, and in which case the delay is less than or equal to the allowable gap value.

The transmissions that occur in each CC translate to the transmission power experienced by the Tx chain. When simultaneous transmissions are enabled across intra-band CCs, the actual transmitted power by the Tx chain is the total transmission power of all UL transmissions occurring on the multiple CCs.

The foregoing description reveals that a certain UL transmission configuration exists which can violate the DMRS bundling conditions. The following describes possible UE behaviors regarding such configurations. Namely, when a DMRS bundling duration is configured or established in one CC, the UE is not configured with UL transmissions in any CC which affect the phase continuity and power consistency requirements associated with DMRS bundling. This implies that a UE does not receive dynamic scheduling information of UL transmissions (e.g., a PUSCH, a PUCCH, an SRS, a physical random access channel (PRACH) which happen concurrently with DMRS bundling durations and not according to the necessary conditions for maintaining phase continuity and power consistency (including meeting the appropriate timeline). In addition, a UE may not receive a dynamic activation of periodic UL signal transmissions which can coincide with the ongoing DMRS bundling procedure and not according to the necessary conditions for maintaining phase continuity and power consistency, including meeting the appropriate timeline.

Furthermore, a UE may not be configured with multiple DMRS bundling durations in intra-band CCs, in which case the UE may be provided with a mechanism for handling such a situation. One such mechanism is that the UE makes a priority decision as to which of the UL transmissions and/or DMRS bundling duration would be maintained or dropped. For example, the UE can favor dynamically configured operations over semi-statically configured operations. That is, if the DMRS bundling duration is configured via a dynamically scheduled PUSCH transmission with repetitions, and the UL transmission is sent from a CG-PUSCH or a periodic SRS transmission, then the UE drops the CG-PUSCH or the periodic SRS.

The UE can also prioritize certain UL transmissions, such as a dynamically scheduled PUSCH, any SRS or dynamically scheduled SRS transmission, or a PRACH transmission, over the DMRS bundling operation. In this case, the UE interrupts the DMRS bundling operation. This prioritizing operation can be performed and the DMRS bundling operation can be interrupted even if the DMRS bundling operation was dynamically configured, as long as a higher priority UL transmission exists.

The priorities in the previous option can also extend to a more general notion of priority is that can be configured with UL transmissions and/or a DMRS bundling operation. For example, a DMRS bundling operation or different UL transmissions can be configured with an associated priority indication. Then, the UE naturally affords the transmission/ operation with the higher priority indication. The UE can refrain from the UL transmission and also stop the DMRS bundling procedure.

Figure 3:
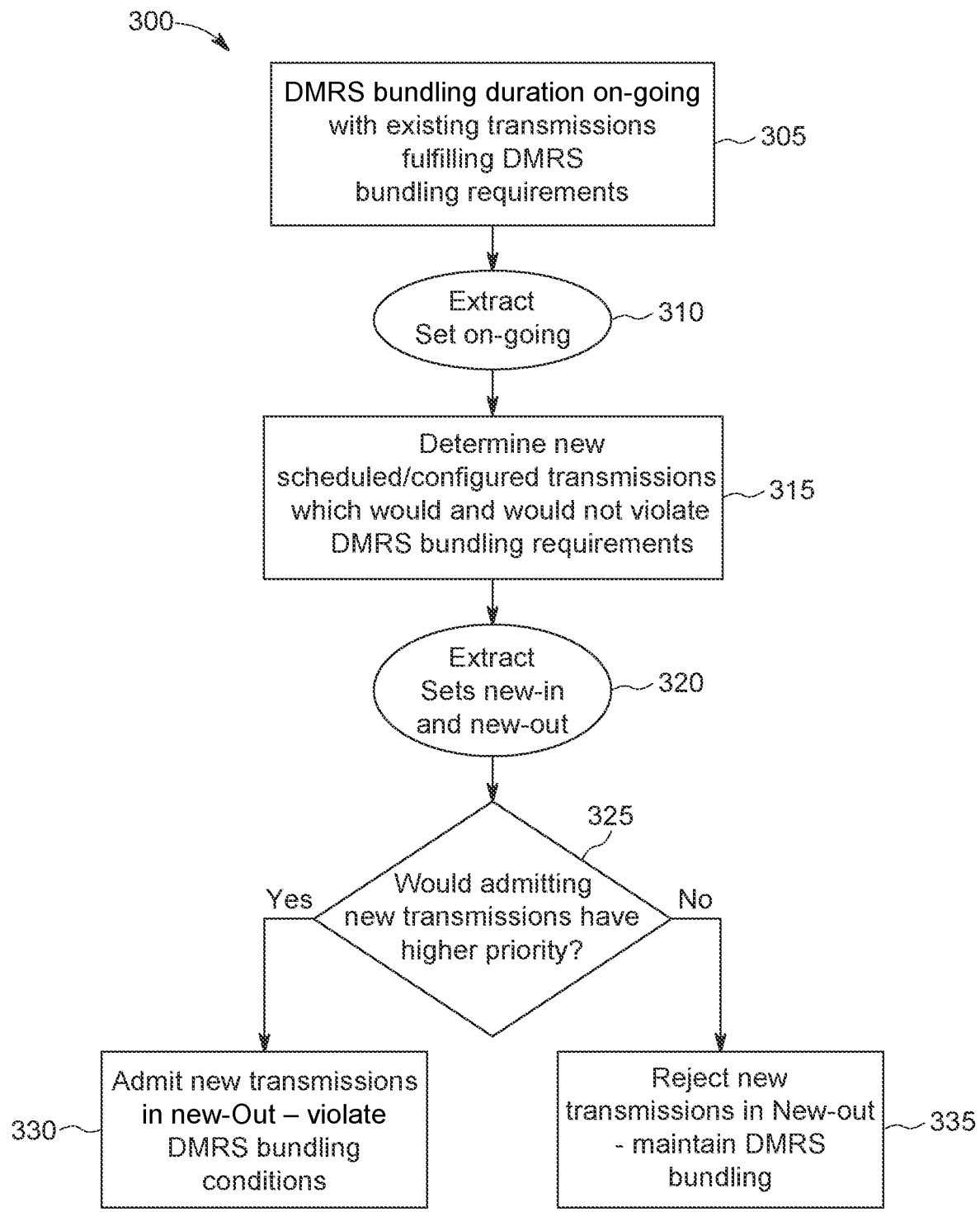
FIG. 3 illustrates a method 300 for handling transmission configurations which violate DMRS bundling requirements, according to an embodiment.

FIG. 3 illustrates a process for handling transmission configurations which violate DMRS bundling requirements, according to an embodiment.

In step 305, it is assumed that the DMRS bundling duration configuration exists or is on-going. The DMRS bundling duration can be extant or established/identified. If the DMRS bundling duration is extant, then there is a set of some on-going transmissions fulfilling the bundling requirements for this DMRS bundling configuration.

In step 310, the set of on-going transmissions fulfilling the bundling requirements is extracted.

In step 315, a new set of scheduled/configured transmissions is determined. This new set can consist of a first subset and a second subset. The first subset (hereinafter, referred to as the set new-in) is the set of new transmissions which would not violate the requirement for the identified/on-going DMRS bundling duration. The second subset (hereinafter, referred to as the set new-out) is the set of new transmissions which would ultimately violate DMRS bundling requirements for the identified/on-going DMRS bundling duration. Admitting/allowing the new transmissions in the set new-out can suspend the DMRS bundling operation, which can effectively cause the on-going transmissions to be incorrectly received at the expense of attempting the new transmissions. However, dropping these new transmissions favors the existing ones.

In step 320, therefore, the set new-in and the set new-out are extracted (i.e., are split). As noted above, a new transmission in violation of the required timeline for DMRS bundling is considered to exist in the set new-out.

In step 325, it is determined whether admitting new transmissions, i.e., the set new-out, would have higher priority than all other transmissions. If so (i.e., Yes in step 325), then in step 330, new transmissions are admitted in set new-out, where such transmissions violate the DMRS bundling conditions. If not (i.e., No in step 325), then in step 335, new transmissions are rejected in set new-out, such that DMRS bundling is maintained.

In further detail, the DMRS bundling duration may be established based on the existence of some UL transmissions. For example, DMRS bundling can be configured for a particular PUSCH scheduling with Type-A repetition. In this case, while these UL transmissions would be on-going and naturally exist in the set new-in, dropping these transmissions would effectively eliminate the need for establishing DMRS bundling.

When the DMRS bundling duration is established based on the UL transmissions, it may be unexpected for the UE to have a different DMRS bundling duration after the proceeding selection/dropping mechanism is executed. Alternatively, the UE can maintain the DMRS bundling duration as unchanged after the selection/dropping mechanism is executed.

This mechanism may be initiated when a set of overlapping transmissions is scheduled/configured with DMRS bundling, and the DMRS bundling duration needs to be initiated based on these transmissions. In this case, the set of overlapping transmissions is extracted (i.e., split) into new-in and new-out as described in step 320, and the set of on-going transmissions is empty.

This mechanism may also be initiated when one or more new transmissions is configured/scheduled which overlap with an on-going DMRS bundling duration, in which case the set of on-going transmissions is not empty, and the new transmissions are extracted into new-in and new-out as described in step 320.

A question becomes whether to admit the new-out set. Many factors can contribute to whether to do so, such as the priority of transmissions in all sets and the number of such transmissions.

For example, transmission with the highest priority is determined in step 325. Specifically, if the set new-out contains a transmission with higher priority than all other transmissions, then in step 330, transmissions in the set new-out are transmitted and DMRS bundling conditions are violated. However, if higher priority transmission exists in either on-going transmissions or the set new-in, rather than in set new-out, then in step 335, transmissions in new-out are not admitted and DMRS bundling is maintained.

If the highest priority in set new-out and the union of ongoing and set new-in are identical, then the same rule can apply based on the second highest priority. If all priorities match in both sets, then the rule favors the set (between new-out and the union of new-in and on-going) with the largest number of transmissions.

The above rule can be generalized by using a priority score for the set. This score takes as input the priority level of all transmissions in the set and computes a priority score for the set. This score can be a function of each priority level in the set and the number of transmissions in the set with this priority level. The score function can also be different when computing the score for different sets. That is, a different score can be computed for the on-going set than that for the new-in or new-out sets. The score for the on-going set can be larger than that for set new-out even if identical transmissions exist in both sets, thus, favoring pre-established transmissions over new ones.

Another rule is to allow any dynamically scheduled PUSCH. In this case, any new UL transmission that is dynamically scheduled is admitted, and if such admission interrupts an actual time domain windowing (TDW), then it is considered as an interruption event and an actual TDW is interrupted and is restarted when the UE has the necessary capability.

As an example, it is assumed that a DMRS bundling duration is established for a particular PUSCH transmission scheduled with Type-A repetitions. An actual TDW is established in a particular duration which spans some of the PUSCH repetitions. A new UL PUSCH transmission is scheduled in another intra-band CC which overlaps with the actual TDW.

If, as reflected in step 325 of FIG. 3, the priority of the new PUSCH is higher than the priority of the original PUSCH, then as reflected in step 330, the new PUSCH is scheduled. As a result, a UE can interrupt the TDW, and may or may not re-start a new TDW depending on the UE's capability. Otherwise, as reflected in step 335, the new PUSCH is dropped, and the actual TDW is continued.

In this case, the on-going set contains the original PUSCH with a priority level, the set new-in is empty and the set new-out is the new PUSCH with another priority level. The priority score function here can be a function which returns the highest priority level in the input set.

Also, determining whether the new PUSCH can be dropped can be based on the UE capability of continuing DMRS bundling (i.e., starting a new TDW) after interrupting the actual TDW. For example, if a UE does not have the capability of starting a new TDW, then maintaining the TDW can have higher priority.

It is noted that the foregoing applies to multiple new UL transmissions and multiple existing UL transmissions, as well, and is not limited to one original PUSCH and one new PUSCH.

Figure 4:
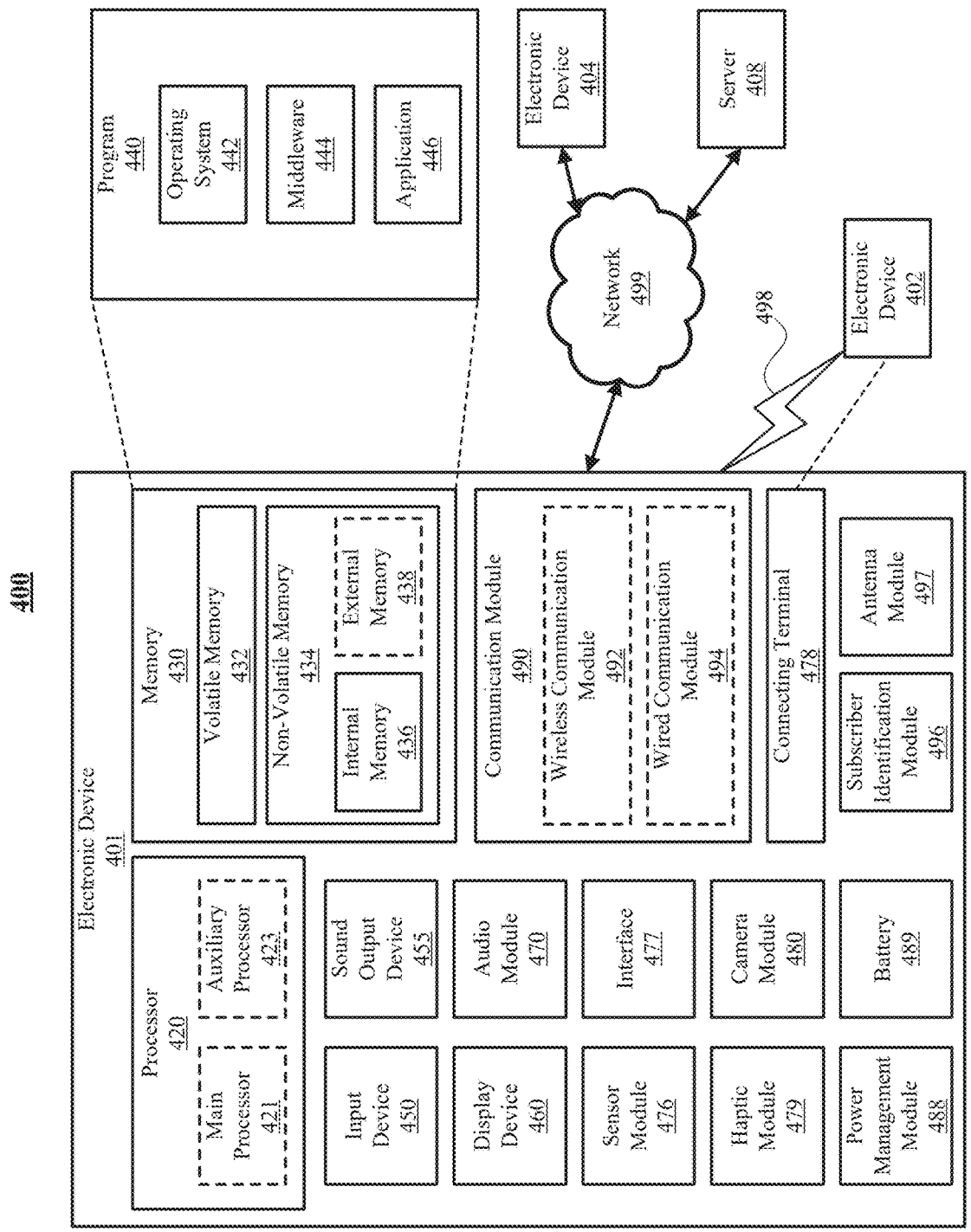
FIG. 4 is a block diagram 400 of an electronic device in a network environment, according to an embodiment.

FIG. 4 is a block diagram of an electronic device in a network environment 400, according to an embodiment.

Referring to FIG. 4, an electronic device 401 in a network environment 400 may communicate with an electronic device 402 via a first network 498 (e.g., a short-range wireless communication network), or an electronic device 404 or a server 408 via a second network 499 (e.g., a long-range wireless communication network). The electronic device 401 may communicate with the electronic device 404 via the server 408. The electronic device 401 may include a processor 420, a memory 430, an input device 440, a sound output device 455, a display device 460, an audio module 470, a sensor module 476, an interface 477, a haptic module 479, a camera module 480, a power management module 488, a battery 489, a communication module 490, a subscriber identification module (SIM) card 496, or an antenna module 494. In one embodiment, at least one (e.g., the display device 460 or the camera module 480) of the components may be omitted from the electronic device 401, or one or more other components may be added to the electronic device 401. Some of the components may be implemented as a single integrated circuit (IC). For example, the sensor module 476 (e.g., a fingerprint sensor, an iris sensor, or an illuminance sensor) may be embedded in the display device 460 (e.g., a display).

The processor 420 may execute, for example, software (e.g., a program 440) to control at least one other component (e.g., a hardware or a software component) of the electronic device 401 coupled with the processor 420 and may perform various data processing or computations, such as the DMRS bundling methods and procedures taught herein.

As at least part of the data processing or computations, the processor 420 may load a command or data received from another component (e.g., the sensor module 446 or the communication module 490) in volatile memory 432, process the command or the data stored in the volatile memory 432, and store resulting data in non-volatile memory 434. The processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or execute a particular function. The auxiliary processor 423 may be implemented as being separate from, or a part of, the main processor 421.

The auxiliary processor 423 may control at least some of the functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). The auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by another component (e.g., the processor 420) of the electronic device 401, from the outside (e.g., a user) of the electronic device 401. The input device 450 may include, for example, a microphone, a mouse, or a keyboard.

The sound output device 455 may output sound signals to the outside of the electronic device 401. The sound output device 455 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. The display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. The audio module 470 may obtain the sound via the input device 450 or output the sound via the sound output device 455 or a headphone of an external electronic device 402 directly (e.g., wired) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. The sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device 402 directly (e.g., wired) or wirelessly. The interface 477 may include, for example, a high-definition multimedia interface (HDMI), a universal serial bus (USB) interface, a secure digital (SD) card interface, or an audio interface.

A connecting terminal 478 may include a connector via which the electronic device 401 may be physically connected with the external electronic device 402. The connecting terminal 478 may include, for example, an HDMI connector, a USB connector, an SI) card connector, or an audio connector (e.g., a headphone connector).

The haptic module 479 may convert an electrical signal into a mechanical stimulus (e.g., a vibration or a movement) or an electrical stimulus which may be recognized by a user via tactile sensation or kinesthetic sensation. The haptic module 479 may include, for example, a motor, a piezoelectric element, or an electrical stimulator.

The camera module 480 may capture a still image or moving images. The camera module 480 may include one or more lenses, image sensors, image signal processors, or flashes.

The power management module 488 may manage power supplied to the electronic device 401. The power management module 488 may be implemented as at least part of, for example, a power management integrated circuit (PMIC).

The battery 489 may supply power to at least one component of the electronic device 401. The battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the AP) and supports a direct (e.g., wired) communication or a wireless communication. The communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or a standard of the Infrared Data Association (IrDA)) or the second network 499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. The antenna module 497 may include one or more antennas, and, therefrom, at least one antenna appropriate for a communication scheme used in the communication network, such as the first network 498 or the second network 499, may be selected, for example, by the communication module 490 (e.g., the wireless communication module 492). The signal or the power may then be transmitted or received between the communication module 490 and the external electronic device via the selected at least one antenna.

Commands or data may be transmitted or received between the electronic device 401 and the external electronic device 404 via the server 408 coupled with the second network 499. Each of the electronic devices 402 and 404 may be a device of a same type as, or a different type, from the electronic device 401. All or some of operations to be executed at the electronic device 401 may be executed at one or more of the external electronic devices 402, 404, or 408. For example, if the electronic device 401 may perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

While the present disclosure has been described with reference to certain embodiments, various changes may be made without departing from the spirit and the scope of the disclosure, which is defined, not by the detailed description and embodiments, but by the appended claims and their equivalents.

What is claimed is:

1. A method performed by a user equipment (UE) using carrier aggregation, the method comprising:
   transmitting, over a first component carrier (CC), a first transmission using a first power and a second transmission using a third power; and
   transmitting, over a second CC and simultaneously with the first transmission and the second transmission over the first CC, a first transmission using a second power and a second transmission using a fourth power,
   wherein the first power is different from the third power and the second power is different from the fourth power, and
   wherein a sum transmission power across the first and second CCs is maintained during an entire bundling duration, and
   wherein a sum of the first power and the second power is equal to a sum of the third power and the fourth power.

2. A method performed by a user equipment (UE) using carrier aggregation, the method comprising:
   transmitting, over a first component carrier (CC), a first transmission and a second transmission; and
   transmitting, over a second CC and simultaneously with the first transmission and the second transmission over the first CC, a first transmission, a second transmission, and a third transmission,
   wherein a first time frame is disposed in the second CC between a start of both the first transmission on the first CC and the first transmission on the second CC,
   wherein the first time frame allows the first transmission on the second CC to start at a different time than when the first transmission on the first CC starts, and
   wherein a second time frame is disposed in the second CC, the second time frame being an offset disposed directly before a start of the first time frame and providing additional time for the UE to process the scheduling information and determine power levels in each transmission on the second CC.

3. The method of claim 2,
   wherein a gap is disposed between a start of the first transmission in the first CC and the first transmission in the second CC.

4. The method of claim 3,
   wherein at least one transmission in the second CC overlaps with at least one transmission in the first CC.

5. The method of claim 4,
   wherein the third transmission on the second CC is performed during the second transmission on the first CC.

6. The method of claim 5,
   wherein the gap comprises an interrupted uplink transmission on the first CC and has a duration that is less than a predetermined value.

7. The method of claim 2,
   wherein a power level used in the first transmission on the first CC and a power level used in the first transmission on the second CC are determined such that a sum transmission power across the first and second CCs is maintained during an entire bundling duration.

8. The method of claim 2,
   wherein, when a bundling duration is configured in one of the first CC or the second CC, uplink transmissions in any CC which affect phase continuity and power consistency requirements associated with bundling are omitted from a configuration of the UE.

9. A new radio user equipment (NR UE), comprising:
   at least one processor; and
   at least one memory operatively connected with the at least one processor, the at least one memory storing instructions, which when executed, instruct the at least one processor to perform a bundling, the bundling comprising:
   a first component carrier (CC) in which a first transmission and a second transmission are performed;
   a second CC in which a first transmission, a second transmission, and a third transmission are performed simultaneously with the first transmission and the second transmission on the first CC;
   a first time frame in the second CC, the first time frame being disposed between a start of both the first transmission on the first CC and the first transmission on the second CC, wherein the first time frame allows the first transmission on the second CC to start at a different time than when the first transmission on the first CC starts; and
   a second time frame occurring in the second CC, the second time frame being an offset disposed directly before a start of the first time frame and providing additional time for the UE to process scheduling information and determine power levels in each transmission on the second CC.

10. The NR UE of claim 9, further comprising:
    a gap disposed between a start of the first transmission on the first CC and the first transmission on the second CC.

11. The NR UE of claim 10,
    wherein at least one transmission on the second CC overlaps with at least one transmission on the first CC.

12. The NR UE of claim 11,
    wherein the third transmission on the second CC is performed during the second transmission on the first CC.

13. The NR UE of claim 12,
    wherein the gap comprises interrupted uplink transmission on the first CC and has a duration that is less than a predetermined value.

14. The NR UE of claim 9,
    wherein a power level used in the first transmission on the first CC and a power level used in the first transmission on the second CC are determined such that a sum transmission power across the first and second CCs is maintained during an entirety of the bundling.

15. The NR UE of claim 9,
    wherein, when a bundling duration is configured in one of the first CC or the second CC, uplink transmissions in any CC which affect phase continuity and power consistency requirements associated with the bundling are omitted from configuration of the NR UE.

* * * * *